US011886861B2

(12) United States Patent
Meshram et al.

(10) Patent No.: US 11,886,861 B2
(45) Date of Patent: Jan. 30, 2024

(54) PROPAGATING APPLICATION PROPERTIES TO MULTIPLE INSTANCES

(71) Applicant: JPMorgan Chase Bank, N.A., New York, NY (US)

(72) Inventors: Amit Meshram, Romansville, PA (US); Maxwell Evers, Wilmington, DE (US); Prakash Ravi, Bear, DE (US); Varun Monga, Newark, DE (US)

(73) Assignee: JP Morgan Chase Bank, N.A., New York, NY (US)

( * ) Notice: Subject to any disclaimer, the term of this patent is extended or adjusted under 35 U.S.C. 154(b) by 304 days.

(21) Appl. No.: 17/517,413

(22) Filed: Nov. 2, 2021

(65) Prior Publication Data

US 2023/0135884 A1 May 4, 2023

(51) Int. Cl.
*G06F 8/65* (2018.01)
*G06F 9/48* (2006.01)

(52) U.S. Cl.
CPC .............. *G06F 8/65* (2013.01); *G06F 9/4881* (2013.01)

(58) Field of Classification Search
USPC ........................................................ 717/172
See application file for complete search history.

(56) References Cited

U.S. PATENT DOCUMENTS

| | | | |
|---|---|---|---|
| 10,521,196 B1 * | 12/2019 | Wang | G06F 9/45529 |
| 2014/0075427 A1 * | 3/2014 | Pallamreddy | G06F 8/65 717/172 |
| 2014/0337064 A1 * | 11/2014 | Weissman | G06Q 30/0627 705/5 |
| 2017/0244598 A1 * | 8/2017 | Crouse | H04L 41/5041 |
| 2019/0036766 A1 * | 1/2019 | Popov | H04L 67/34 |
| 2021/0026613 A1 * | 1/2021 | Tung | H04L 63/20 |
| 2022/0075546 A1 * | 3/2022 | Potyraj | G06F 11/2094 |

* cited by examiner

*Primary Examiner* — Qing Chen
*Assistant Examiner* — Clint Thatcher
(74) *Attorney, Agent, or Firm* — Nwamu IP Law

(57) ABSTRACT

In one example, a method for updating an application that has multiple instances running in a distributed cloud environment is disclosed. The method may include the operation of generating a dynamic property bus interface. The method may write an application property value through the dynamic property bus interface to a database for storage and propagate the property value to the multiple instances of the application in the distributed cloud environment.

13 Claims, 4 Drawing Sheets

PROPAGATING APPLICATION PROPERTIES TO MULTIPLE INSTANCES

BACKGROUND

A distributed cloud environment may include multi-cloud deployment and geographically dispersed computing resources. This distributed cloud environment type is dynamically scalable and offers on-demand access to configurable computing resources.

BRIEF DESCRIPTION OF THE DRAWINGS

The drawings illustrate only particular examples of the disclosure and therefore are not to be considered to be limiting of their scope. The principles here are described and explained with additional specificity and detail through the use of the accompanying drawings.

DETAILED DESCRIPTION

Distributed cloud environment scalability can enable provisioning of multiple instances of an application. When application properties are pushed to multiple instances, known endpoints are needed to push the application properties to an exposed REST (representational state transfer) service.

However, with autoscaling (varying application instances based on demand), if a pool endpoint is hit, all instances in the pool are not being reached. The number of instances at any given moment is also unknown, and as such, it is difficult to propagate application properties to an unknown number of instances.

The present disclosure addresses the foregoing by providing a method, system and computer program product for updating an application that has multiple instances running in a distributed cloud environment. For some examples, the method generates a dynamic property bus interface. The method may write an application property value through the dynamic property bus interface to a database (such as Cassandra™) for storage.

The method then propagates the property value to the multiple instances of the application in the distributed cloud environment. In one example, property values may be propagated by executing a scheduler on each instance of the application after startup of the instance and by reading the application property value from the database.

In this manner, when a REST service is used to push application properties, and the number of instances is unknown due to autoscaling, the present disclosure accounts for all provisioned instances to propagate the application properties to all such instances in the distributed cloud environment. Application properties can be pushed in real time with dynamic updates, without recycling applications and thus avoiding outages. The update process is fast, efficient and requires less developer intervention.

Figure 1:
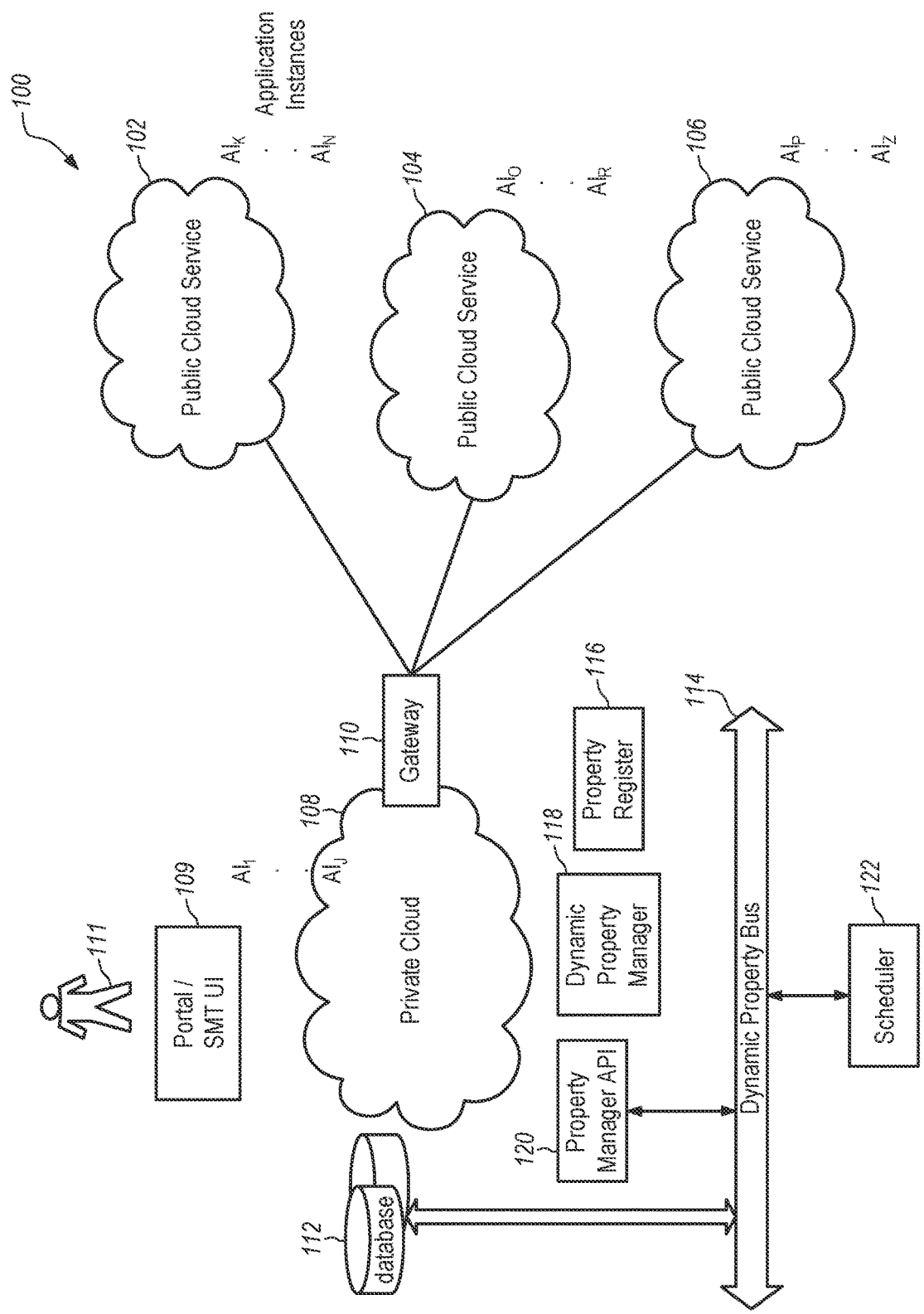
FIG. 1 illustrates a distributed cloud environment to dynamically update properties across all application instances according to examples of the present disclosure.

FIG. 1 illustrates a distributed cloud environment 100 to dynamically update application properties across all running instances of an application according to examples of the present disclosure.

In the example of FIG. 1, distributed cloud environment 100 includes three public cloud services 102, 104 and 106 that are communicably coupled to a private cloud 108 via a gateway 110. Although not shown, distributed cloud environment 100 may include additional or fewer public and private clouds, and the arrangement and components of such a distributed cloud environment may vary.

In FIG. 1, private cloud 108 may be a corporate enterprise data network secured by a firewall (not shown). This secure private cloud may then be coupled via gateway 110 to the public cloud services 102, 104, 106. Public cloud services 102, 104, 106 may be from any one or more public cloud service providers such as Amazon AWS, Microsoft Azure, Oracle Cloud, etc.

Irrespective of the cloud service type, each cloud service is dynamically scalable and may facilitate the execution of multiple instances of any application. Here, private cloud 108 is running an application with multiple instances $AI_1$ through $AI_J$. Similarly, public cloud service 102 has multiple instances $AI_K$ through $AI_N$ of the same application.

Public cloud service 106 also has multiple application instances $AI_P$ through $AI_Z$. The application instances can vary depending upon demand. In particular, the cloud platform includes an autoscaling feature (not shown) that can increase or decrease capacity as necessitated by demand.

When demand increases, additional instances are automatically launched and provisioned. When demand reduces, instances are automatically deregistered and decommissioned commensurate with the reduced demand.

However, as previously noted, with autoscaling to increase/decrease the number of instances, it can be difficult to track the number of application instances on the platform. Consequently, application properties cannot be easily propagated to all running instances of the application. The present disclosure addresses the foregoing by providing systems, methods and computer products for updating an application that has multiple instances running in a distributed cloud environment as further described below.

In FIG. 1, distributed cloud environment 100 further includes a portal/SMT UI 109, a database 112 and a dynamic property bus 114 interface. Portal/SMT UI may be employed by a system administrator 111 to access and manage the distributed cloud environment 100. For example, such management may include use of an SMT (server management tool) to manage applications, monitor server performance, and manually provision and decommission instances.

In FIG. 1, database 112 may be any database to store application property values. An application property value is a value of an environment-specific variable that can enable, disable or limit a specific functionality such as an arbitrary decision inside the application. As an example, an application property value may be employed to set a timeout. As another example, an application property value may be to pass a list of users through the application.

The database 112 may be implemented in Cassandra™. In another example, the database 112 may be a NoSQL database although other database types may be employed.

The database 112 may have a distributed architecture that spans multiple clusters. Thus, although not shown, database 112 may be deployed across a large number of nodes spanning private cloud 108 and public cloud services 102, 104 and 106. As shown, in one example, database 112 is to interface with the dynamic property bus 114. The dynamic property bus 114 is an interface to which any database, data storage device or other real-time data stream can be connected. In other words, dynamic property bus 114 provides interaction with an arbitrary data store. Methods to read and write from the data store are implemented. An example, implementation is provided in the Appendix below.

Distributed cloud environment 100 further includes a property register 116, a dynamic property manager 118 and a property manager API (Application Programming Interface) 120. As shown, the property manager API 120 may interface with the dynamic property bus 114. Property manager API 120 may be a module, program or software instructions to receive/respond to calls and facilitate data exchange between the http client (e.g., on portal/SMT UI 109) and the dynamic property manager 118/database 112.

Here, the dynamic property manager 118 is a module, software or program for housing for the property register(s) 116. As implied by its name, the dynamic property manager 118 is to dynamically manage the retrieving and setting of application property values from/to the property register(s) 116.

In one example, the dynamic property manager 118 may receive instructions from property manager API 120 to invoke the getter (not shown). Here, the getter may return an application property value while facilitating the protection of such data.

The property register(s) 116 may be a computer storage medium, memory and the like for temporary storage of each application property that is propagated. As implied by its name, the scheduler 122 is a module, program or software instructions to schedule, based on a timer, interaction with database 112 to update application properties.

In operation, briefly, system administrator 111 through the portal/SMT UI 109 initiates a post operation with a key/value pair, where the key is the property and the corresponding value is to be injected into an application instance. Property manager API 120 via dynamic property manager 118 receives the data and creates an entry in property register(s) 116.

The property manager API 120 via the dynamic property bus 114 interface then inserts the property into a table in the database 112. The scheduler 122 periodically fetches and updates properties from the database 112 cache; if the key value is in the database 112 cache, the key value is applied to the applicable application instance.

In short, based on the scheduler 122 timing, each instance of the application is reading from the property cache and using the key to read the appropriate string converters (like parsing String to Double/Int/Boolean) and setters to inject the value into the corresponding beans without restarts.

Figure 2:
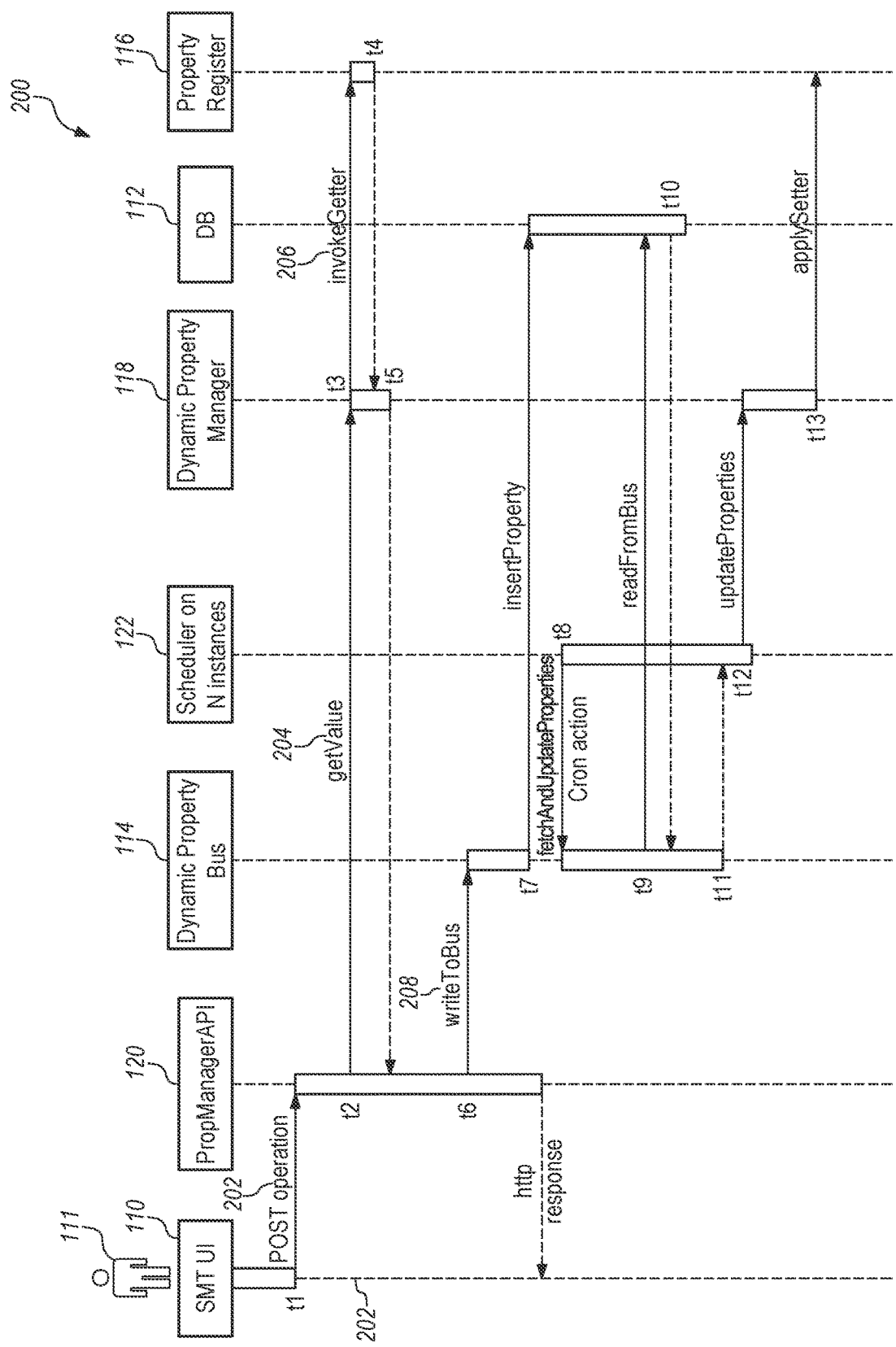
FIG. 2 is a sequence diagram illustrating propagating of application properties to running instances of the application according to an example of the present disclosure.

FIG. 2 is a sequence diagram 200 for propagating application properties according to an example of the present disclosure.

In FIG. 2, the process begins at $t_1$ wherein administrator 111 can use the portal/SMT UI 109 to initiate a POST operation 202 against a REST service that resides within the distributed cloud environment 100 (FIG. 1). As noted, this REST payload takes a key/value pair, where the value is the property value to be injected into an instance.

At $t_2$, property manager API 120 is invoked by POST operation 202. In turn, the property manager API 120 invokes the getValue method 204 to write to the dynamic property manager 118. In one example, the dynamic property manager 118 may be housing for a plurality of property register(s) 116. As noted above, for each application property that is propagated, a corresponding property register 116 is created.

Thus, at t3, dynamic property manager 118 invokes invokeGetter method 206 to retrieve the application value. For some examples, in each property register 116, three different items may be set. The first is a string converter that pulls in values as a string from the POST request. In this manner, the values can be turned into a double float or other specific enumeration for conversion.

The second of the three items may be a setter to set the application value. Specifically, a method that can inject the property value into the location of the application is registered. In this manner, setting the value is decoupled from the bean, or class is calling the method. The method itself is simply registered. The third item to be registered is a getter to retrieve the application value as noted above.

At t4, the property value is returned to the dynamic property manager 118 and sent to property manager API 120 at t5. Generally, t2 through t5 is all about fetching the current value, validate existence and that this current value is being propagated out to all the instances. If there is no currents value, attempts to send to all instances are discontinued.

At t6, property manager API 120 invokes the writeToBus method 208 to write to the dynamic property bus 114, which in turn at t7, invokes the database layer to insert the property value into the table at DB 112.

At t8, the scheduled task fetch and update properties is initiated. Specifically, scheduler 122 invokes a cron action and interfaces with dynamic property bus 114 to fetch and update properties from the database 112 cache. A cron action is a periodic event, here, to fetch and update properties at designated periodic intervals that are configurable. Note that scheduler 122 is executed for all instances that are launched and provisioned. In this manner, irrespective of autoscaling, the application values are propagated to all instances.

At t9 dynamic property bus 114 reads the bus (DB 112) to fetch any properties from the table and to determine if any updates to the table can be made. Specifically, at t9 the DynamicPropertyBus method to readFromBus (appId) is invoked to read a list of properties from the DB 112 (t10) pulling the set into the application. At t11, dynamic property bus 114 returns the set of properties to scheduler 122, which then invokes the DynamicPropertyManager's updateProperties( )method (of dynamic property manager 118) with the list provided from the dynamic property bus 114. At t13, dynamic property manager 118 iterates over that list and for each item in the list converts the value from string to the desired type, and then applies the setter to the value to inject it into place.

In this manner, notwithstanding autoscaling, the present disclosure can propagate the application properties to all application instances in real time with dynamic updates and without outages. The application propagation operation is seamless, efficient and requires less developer intervention.

Figure 3:
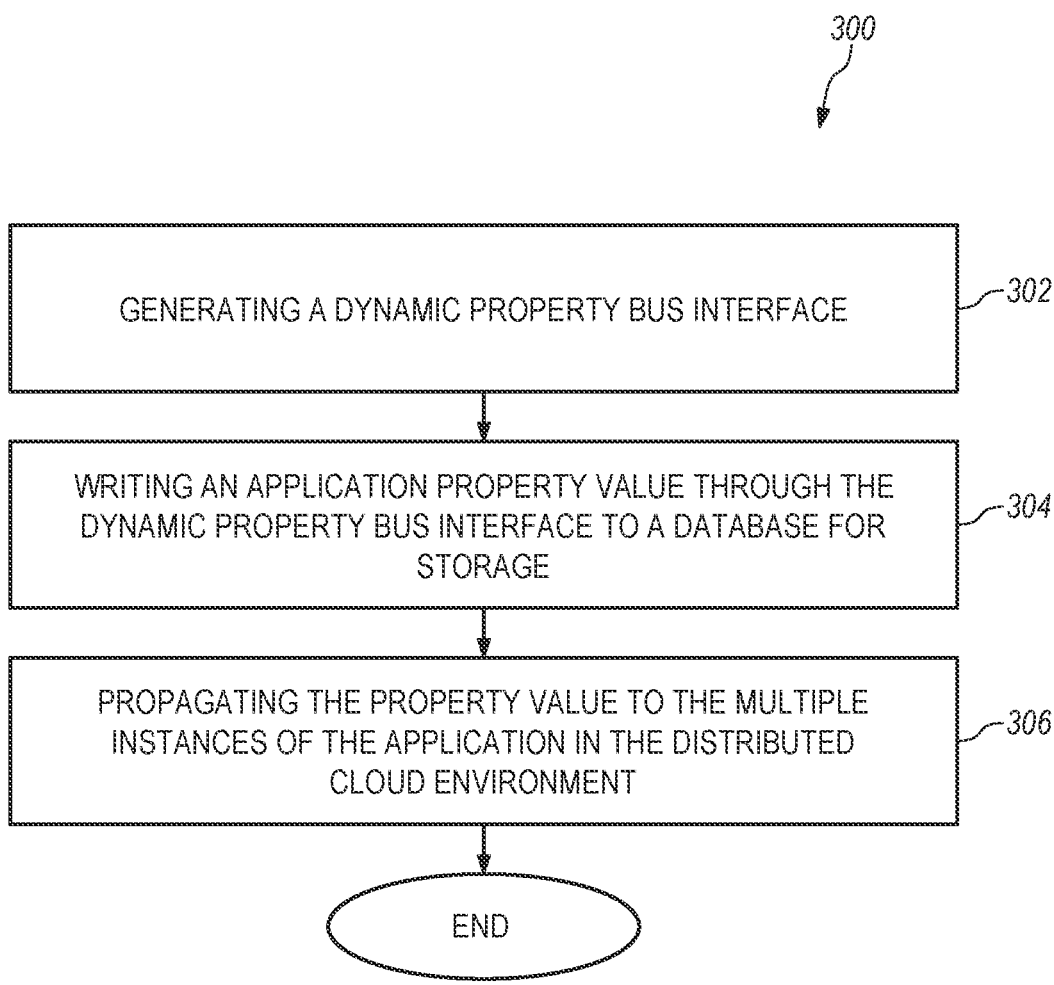
FIG. 3 illustrates a method for updating an application that has multiple instances running in a distributed cloud environment of FIG. 1 according to examples of the present disclosure.

FIG. 3 illustrates a method 300 for updating an application that has multiple instances $AI_1 \ldots AI_J, AI_K \ldots AI_N, AI_O \ldots AI_R,$ and $AI_P \ldots AI_Z$ (FIG. 1) running in a distributed cloud environment 100 (FIG. 1) according to examples of the present disclosure.

In FIG. 3, at block 302, method 300 includes generating a dynamic property bus 114 (FIG. 1) interface. At block 304, method 300 includes writing an application property value through the dynamic property bus 114 interface to database 112 (FIG. 1) for storage. At block 306, method 300 propagates the property value to the multiple instances $AI_1 \ldots AI_J$, $AI_K \ldots AI_N$, $AI_O \ldots AI_R$, and $AI_P \ldots AI_Z$ of the application in the distributed cloud environment 100.

For some examples, propagating the property value to the multiple instances ($AI_1 \ldots AI_J$, $AI_K \ldots AI_N$, $AI_O \ldots AI_R$, and $AI_P \ldots AI_Z$) of the application in the distributed cloud environment may be effectuated by via scheduler 122. Scheduler 122 may be executed on each instance ($AI_1 \ldots AI_J$, $AI_K \ldots AI_N$, $AI_O \ldots AI_R$, and $AI_P \ldots AI_Z$) of the application after startup of the instance and reading the application property value from the database 112.

Figure 4A:
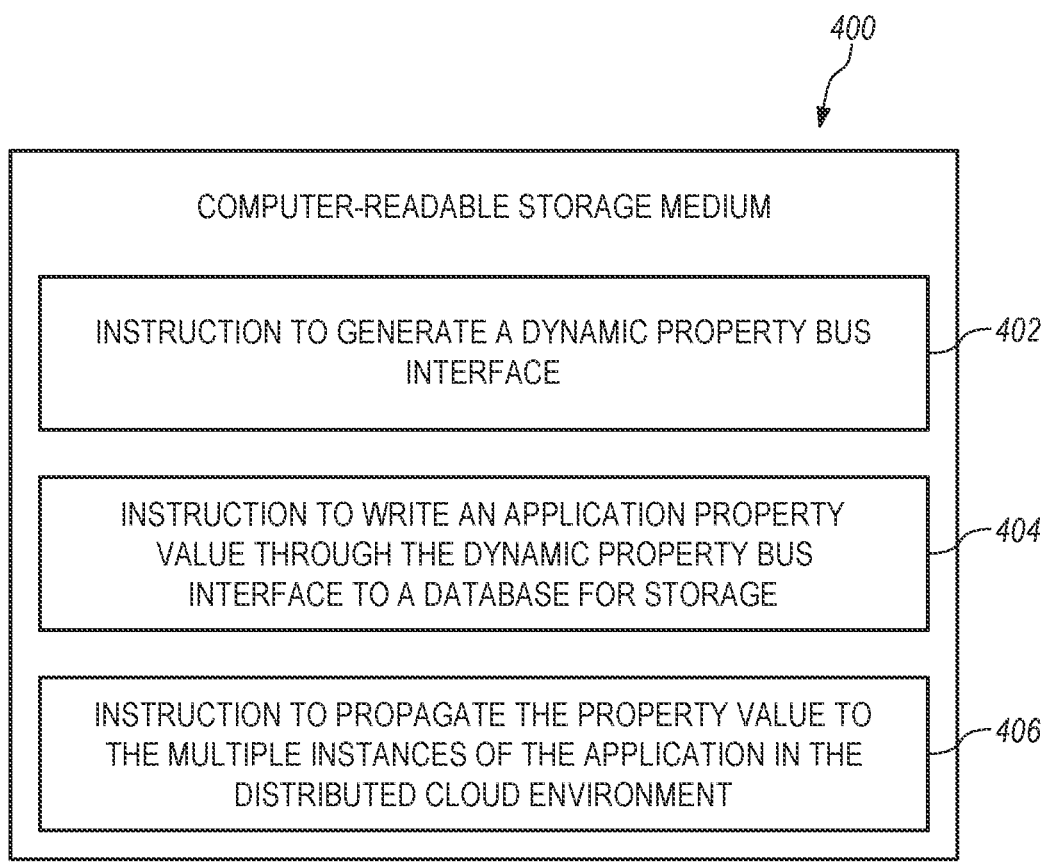
FIG. 4A illustrates example instructions stored on an example non-transitory computer-readable storage medium to update an application that has multiple instances running in the distributed cloud environment of FIG. 1 according to examples of the present disclosure.

FIG. 4A illustrates example instructions stored on an example non-transitory computer-readable storage medium 400 to update an application that has multiple instances ($AI_1 \ldots AI_J$, $AI_K \ldots AI_N$, $AI_O \ldots AI_R$, and $AI_P \ldots AI_Z$) (FIG. 1) running in a distributed cloud environment 100 (FIG. 1) according to examples of the present disclosure.

Figure 4B:
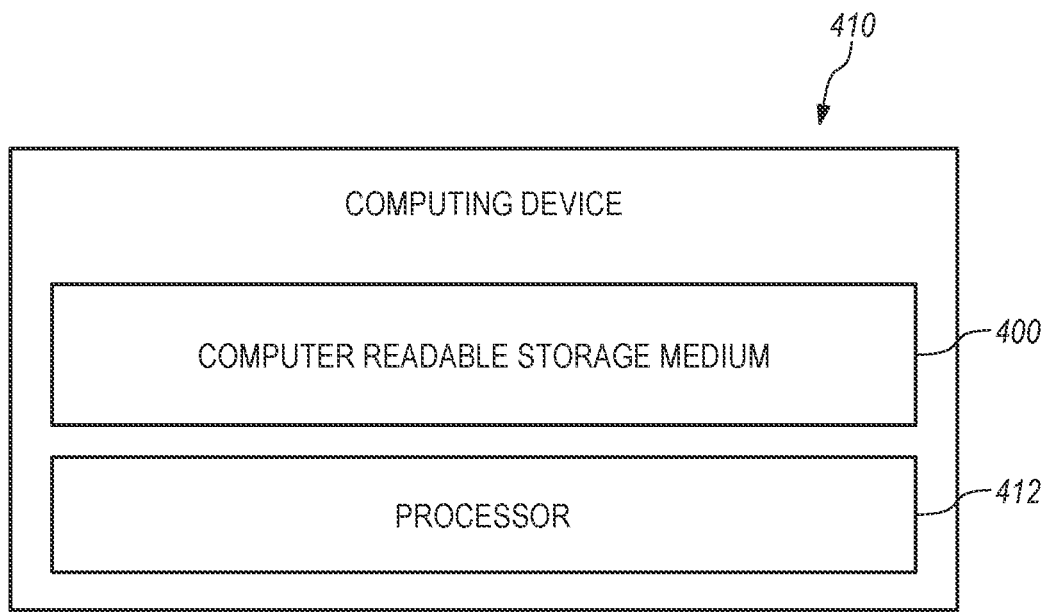
FIG. 4B illustrates an example computing device 410 according to examples of the present disclosure.

As shown in FIG. 4A, the non-transitory computer-readable storage medium 400 includes instruction 402 that may cause a processor 412 (FIG. 4B) to perform the operation of generating a dynamic property bus 114 (FIG. 1) interface. Instruction 404 may cause processor 412 to perform the operation of writing an application property value through the dynamic property bus 114 interface to database 112 (FIG. 1) for storage.

Instruction 406 may cause processor 412 to perform the operation of propagating the property value to the multiple instances $AI_1 \ldots AI_J$, $AI_K \ldots AI_N$, $AI_O \ldots AI_R$, and $AI_P \ldots AI_Z$ of the application in the distributed cloud environment 100.

For some examples, propagating the property value to the multiple instances $AI_1 \ldots AI_J$, $AI_K \ldots AI_N$, $AI_O \ldots AI_R$, and $AI_P \ldots AI_Z$ of the application in the distributed cloud environment 100 may be effectuated by causing processor 412 to execute scheduler 122 on each instance $AI_1 \ldots AI_J$, $AI_K \ldots AI_N$, $AI_O \ldots AI_R$, and $AI_P \ldots AI_Z$ of the application after startup of the instance and by reading the application property value from the database 112.

The non-transitory computer-readable storage medium 400 may be any electronic, magnetic, optical, or other physical storage device that stores executable instructions. For example, the non-transitory computer-readable storage medium 400 may be random access memory (RAM), an electrically-erasable programmable read-only memory (EEPROM), a storage drive, an optical disc, or the like. The non-transitory computer-readable storage medium 400 can be encoded to store executable instructions that cause a processor to perform operations according to examples of the disclosure.

The present disclosure may employ a software stack to enlist the underlying tools, frameworks, and libraries used to build and run example applications of the present disclosure. Such a software stack may include PHP, React, Cassandra, Hadoop, Swift, etc. The software stack may include both frontend and backend technologies including programming languages, web frameworks servers, and operating systems. The frontend may include JavaScript, HTML, CSS, and UI frameworks and libraries. In one example, a MEAN (MongoDB, Express.js, Angular JS, and Node.js) stack may be employed. In another example, a LAMP (Linux, Apache, MySQL, and PHP) stack may be utilized.

Any suitable programming language can be used to implement the routines of particular examples including Java, Python, JavaScript, C, C++, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a software program.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

1. Example Dynamic Property Bus Implementation

```
public class DatabasePropertyBus implements DynamicPropertyBus{
    private final DynamicPropCacheRepo;
    public DatabasePropertyBus(DynamicPropCacheRepo
    dynamicPropCacheRepo){
        this.dynamicPropCacheRepo=dynamicPropCacheRepo;
    }
    @Override
    public void writeToBus(DynamicPropertyCacheModel input){
        dynamicPropCacheRepo.insertProperty(input);
    }
    @Override
    public List<DynamicPropertyCacheModel> readFromBus(String
appId) {
        DynamicPropertyCacheModel readRequest = new
DynamicPropertyCacheModel( );
        readRequest.setAppId(appId);
        return dynamicPropCacheRepo.readProperty(readRequest);
    }
}
```

2. Example Dynamic Property Manager Interface

```
Interface for the manager...
public interface DynamicPropertyManager {
    public void updateProperties(List<DynamicPropertyCacheModel>
model);
    public String getPropertiesValue(String propertyKey);
    Collection<String> getKeys( );
    Collection<Property> getProperties( );
}
```

The invention claimed is:

1. A method for updating an application that has multiple instances running in a distributed cloud environment, the method comprising:
   generating a dynamic property bus interface;
   writing an application property value through the dynamic property bus interface to a database for storage; and propagating the property value to the multiple instances of the application in the distributed cloud environment.

2. The method of claim 1 wherein propagating the property value to the multiple instances of the application in the distributed cloud environment is by
executing a scheduler on each instance of the application after startup of the instance; and
reading the application property value from the database.

3. The method of claim 1 further comprising storing each application property value in its own corresponding property register.

4. The method of claim 2 wherein the scheduler is to periodically fetch and update application properties from the database.

5. A computer program product having a non-transitory, computer-readable storage medium having instructions stored thereon, which when executed by a processor is adapted to perform:
generating a dynamic property bus interface;
writing an application property value through the dynamic property bus interface to a database for storage; and
propagating the property value to the multiple instances of the application in the distributed cloud environment.

6. The computer program product of claim 5 wherein propagating the property value to the multiple instances of the application in the distributed cloud environment is by causing the processor to:
execute a scheduler on each instance of the application after startup of the instance; and
read the application property value from the database.

7. The computer program product of claim 5 further comprising causing the processor to store each application property value that is propagated in a property register.

8. The computer program product of claim 5 wherein the scheduler is to periodically fetch and update application properties from the database.

9. A system for updating an application that has multiple instances running in a distributed cloud environment, the system comprising:
a processor;
a database; and
a dynamic property bus interface communicably coupled to the database;
wherein the processor is to write an application property value through the dynamic property bus interface to a database for storage; and
the processor is to propagate the property value to the multiple instances of the application in the distributed cloud environment.

10. The system of claim 9 wherein the processor propagates the property value to the multiple instances of the application in the distributed cloud environment by
executing a scheduler on each instance of the application after startup of the instance; and
reading the application property value from the database.

11. The system of claim 9 further comprising a plurality of property registers, wherein each property register is to store each application property value that is propagated.

12. The system of claim 9 further comprising a scheduler module to periodically fetch and update application properties from the database.

13. The system of claim 11 further comprising a dynamic property manage module to manage retrieving and setting of application property values from/to the property registers.

* * * * *